UNITED STATES PATENT OFFICE.

CECIL O. PHILLIPS, OF NEW YORK, N. Y., ASSIGNOR TO THE AMERICAN COTTON OIL COMPANY, OF NEW YORK, N. Y., A CORPORATION OF NEW JERSEY.

FOOD PRODUCT.

1,410,345. Specification of Letters Patent. Patented Mar. 21, 1922.

No Drawing. Application filed April 5, 1921. Serial No. 458,805.

*To all whom it may concern:*

Be it known that I, CECIL O. PHILLIPS, a citizen of the United States, residing at New York, in the county of New York, State of New York, have invented certain new and useful Improvements in Food Products; and I do hereby declare the following to be a full, clear, and exact description of the invention, such as will enable others skilled in the art to which it appertains to make and use the same.

This invention relates to an improved food product or stock food comprising cottonseed meal and calcium chloride intimately combined with each other.

Cottonseed meal is largely used for feeding purposes, but its use for certain purposes, such as for feeding hogs, horses, calves and lambs is limited or precluded by the toxic effect of the meal, which may prove fatal in case of continued and prolonged feeding.

The improved stock food or food product of the present invention possesses advantages over ordinary cottonseed meal, such as increased feeding value, decreased toxicity, less objectionable after effects, or even substantial elimination of objectionable after effects, etc.

The improved food product of the present invention is made by incorporating calcium chloride in the cottonseed meats during the regular method of manufacturing cottonseed meal, or by incorporating calcium chloride in cottonseed meal after the removal of cottonseed oil, substantially as set forth.

The treatment of the cottonseed with the calcium chloride solution, and the incorporation or combination of the solution therewith can be carried out in different ways.

The cottonseed meats, prior to the cooking and expression of oil therefrom, can be intimately combined with the calcium chloride solution, for example, by spraying the solution upon the meats and intimately mixing the solution therewith, and then subjecting the treated meats to a cooking operation, subsequently pressing the oil from the cooked meats, and breaking up and grinding the pressed cake in the usual way. This method of treatment has the advantage that the oil extraction is improved by the calcium chloride treatment prior to the cooking and pressing operations, while the calcium chloride solution acts upon and is intimately combined with the substance of the resulting meal, during the cooking operation.

Instead of treating the cottonseed meats with the calcium chloride solution prior to the cooking operation, the cooked meats may be treated and intimately combined therewith prior to the pressing operation, and, in this case, the calcium chloride solution will have an opportunity of acting upon and combining with the hot meats during the pressing operation.

According to another method of procedure, the cottonseed meal, after the cooking and pressing operations, is intimately treated and combined with the calcium chloride solution. The press cake can thus be crushed in the usual cake breaker and then ground to form cottonseed meal, and the cottonseed meal can then be treated and intimately combined with the calcium chloride solution. One advantageous method of doing this is to supply the calcium chloride solution in the form of a spray or mist, by means of suitable atomizing nozzles, into falling streams of the cottonseed meal, and then collecting and further mixing the treated meal. The meal can be supplied by means of a conveyor having a perforated bottom through which the meal falls in a series of fine streams, and the calcium chloride solution can be supplied under pressure and in regulated amount to an atomizing nozzle or a series of nozzles so arranged as to give an intimate distribution of the solution throughout the falling streams of the meal. The meal can then be collected and further mixed in a suitable conveyor and then conveyed to the place of storage for further use.

The calcium chloride solution can be made up in the form of a stock solution and supplied in regulated amount to the atomizing nozzles. The solutions can also vary somewhat in their calcium chloride content, and the amount of calcium chloride incorporated with the meal, as well as the amount of water added with the calcium chloride, can be varied and regulated to give a meal of regulated calcium chloride and moisture content. A strong or saturated calcium chloride solution is usually preferable, for example, a solution of 30° Be'. to 40° Be'. The amount of the solution incorporated with the meal may, for example, be such as will give about 1% calcium chloride in the final product.

For example, a solution of about 32° Be'. can be supplied under a pressure of 25 lbs. per sq. in. to an atomizing nozzle and incorporated with the cotton-seed meal, in the manner above described, in the proportion of about 45 gals. of solution containing about 115 lbs. of actual calcium chloride to about 11,200 lbs. of meal, so that the resulting meal will contain about 1% of calcium chloride. A larger or smaller amount of calcium chloride can be intimately incorporated with the meal in a similar manner, by regulating the strength of the calcium chloride used as well as the amount of the solution.

The treatment of the meal with the calcium chloride solution can advantageously be carried on as a continuous operation by treating the meal as it flows continuously from the grinder on its way to its place of storage or packaging, and the rate of flow of the meal and the strength and amount of the calcium chloride solution can be suitably regulated, by automatic means or otherwise, to give a substantially constant and continuous treatment.

If the hot cottonseed press cake from the press is broken up and ground and treated while still hot with a hot calcium chloride solution, the calcium chloride solution will act upon the hot meal and combine therewith in a somewhat similar manner as when the meal is cooked or further heated after the incorporation of the calcium chloride solution therewith. Where a more intimate combination of the calcium chloride with the meal constituents is desired, the treated meal containing the calcium chloride solution may be subjected to a further heating or cooking operation.

The treatment of the cottonseed meal in the manner above described results in the production of an improved stock food as compared with the untreated meal. The treated meal has shown a much higher feeding value than the untreated meal made at the same time from the same seed: that is, the animals fed with the treated meal showed a higher gain per lb. of cottonseed meal fed than those to which the untreated meal was given.

The calcium chloride appears to combine with or to change certain of the constituents of the meal, such as those having toxic properties, and the treated meal appears to have lost completely or to a considerable extent the toxic properties of the untreated meal. It is especially advantageous that this partial or complete neutralization of toxic action is accompanied by the addition to the meal of a valuable feeding constituent, namely, a mineral calcium salt.

Among the other advantages which the treatment with calcium chloride brings about are a preservation of the meal and a regulated moisture content.

I claim:

1. A stock food comprising cottonseed meal treated and intimately combined with calcium chloride.

2. A stock food comprising cottonseed meal intimately combined with a solution of calcium chloride containing about 1% of calcium chloride based on the total weight of the meal.

3. A method of producing a stock food which comprises treating and intimately combining cottonseed meal with a solution of calcium chloride.

4. The method of producing a stock food which comprises heating cottonseed meal in intimate admixture with a solution of calcium chloride.

5. The method of producing a stock food which comprises adding a solution of calcium chloride to cooked cottonseed meats and subsequently expressing the oil.

In testimony whereof I affix my signature.

CECIL O. PHILLIPS.